United States Patent [19]

Ward

[11] Patent Number: 5,197,754
[45] Date of Patent: Mar. 30, 1993

[54] COLLAPSIBLE BEACH CART

[76] Inventor: Lyla B. Ward, 29 Woodbine Rd., Stanford, Conn. 06903

[21] Appl. No.: 712,519

[22] Filed: Jul. 29, 1991

[51] Int. Cl.⁵ .............................................. B62B 1/12
[52] U.S. Cl. .................................. 280/655; 280/47.26; 280/652
[58] Field of Search ................ 280/638, 35, 639, 651, 280/652, 654, 655, 655.1, 659, DIG. 6, 47.17, 47.18, 47.24, 47.26, 47.27, 47.29, 47.315, 37

[56] References Cited

U.S. PATENT DOCUMENTS

| | | | |
|---|---|---|---|
| 2,778,654 | 1/1957 | Gottlieb | 280/47.26 |
| 2,786,692 | 3/1957 | Timpson | 280/654 |
| 3,697,095 | 10/1972 | Howell | 280/47.26 |
| 4,017,091 | 4/1977 | Wallen | 280/DIG. 6 |
| 4,452,468 | 6/1984 | Eads et al. | 280/654 |
| 4,792,152 | 12/1988 | Carolan | 280/DIG. 6 |
| 4,887,837 | 12/1989 | Bonewicz, Jr. et al. | 280/47.26 |
| 5,002,304 | 3/1991 | Carrigan, Jr. | 280/47.29 |

Primary Examiner—Richard M. Camby
Attorney, Agent, or Firm—Robert M. Sperry

[57] ABSTRACT

An improved cart for carrying articles comprising a rigid frame having a collapsible handle, a rear support portion and an axle with removable wheels and storage member for attaching the wheels to the frame in a manner to minimize the storage area required, together with a fabric article carrier having a opening at its upper end which is reinforced to normally urge the opening to an open position and a rigid member which is hinged to the frame and which is extendable to support the lower portion of the article carrier and which can be folded against the frame to facilitate storage of the cart.

8 Claims, 1 Drawing Sheet

COLLAPSIBLE BEACH CART

BACKGROUND

1. Field of Invention

This invention relates to carts and is particularly directed to two-wheeled carts which are collapsible for convenient storage and which can be assembled quickly and easily, when desired, for transporting articles.

2. Prior Art

It is often desirable to transport a plurality of relatively lightweight articles from one location to another. Numerous types of carts are available for accomplishing this. However, many of the prior art carts are of rigid construction, which may be desirable for some purposes, but is most undesirable for other purposes. Thus, carrying groceries from a store to ones home or transporting beach chairs, blankets, books and the like from ones automobile to a desired location on a beach are typical uses for carts. However, this need for such carts is intermittent and it is highly desirable that such carts be collapsible for storage when not needed for transporting articles. Various types of collapsible carts have also been proposed heretofore, but some prior art carts have been extremely complicated and difficult to collapse or assemble. Other prior art carts have required relatively large areas for storage, when not in use. Still other prior art carts have had a rigid rear frame comprising merely an axle and handle and have had fabric article carrier means which were hung on the frame, but which were, otherwise, unsupported. Unfortunately, such unsupported fabric article carrier means tend to collapse against the frame which closes the mouth of the article carrier means and makes it difficult to insert articles into or remove them from the article carrier means. Thus, none of the prior art carts have been entirely satisfactory.

BRIEF SUMMARY AND OBJECTS OF INVENTION

These disadvantages of prior art carts are overcome with the present invention and an improved cart is provided which can be quickly and easily collapsed or assembled, when desired, and which has an article carrier means with an opening which is held open to facilitate inserting articles into and removing articles from the article carrier means.

The advantages of the present invention are preferably attained by providing an improved collapsible cart comprising a rigid frame having a collapsible handle, a rear support portion and an axle with removable wheels and storage means for attaching the wheels to the frame in a manner to minimize the storage area required, together with a fabric article carrier means having a opening at its upper end which is reinforced to normally urge the opening to an open position and a rigid member which is hinged to the frame and which is extendable to support the lower portion of the article carrier means and which can be folded against the frame to facilitate storage of the cart.

Accordingly, it is an object of the present invention to provide an improved cart for carrying articles.

Another object of the present invention is to provide an improved cart for carrying articles which can be quickly and easily collapsed for storage and which, when desired, can be reassembled for use with equal facility.

An additional object of the present invention is to provide an improved cart for carrying articles which can be quickly and easily collapsed for storage in a minimal area and which, when desired, can be reassembled for use with equal facility.

A further object of the present invention is to provide an improved cart for carrying articles having article carrier means with an opening at its upper end which is reinforced to normally urge the opening to an open position to facilitate insertion of articles into and removal of articles from within the article carrier means.

A specific object of the present invention is to provide an improved cart for carrying articles comprising a rigid frame having a collapsible handle, a rear support portion and an axle with removable wheels and storage means for attaching the wheels to the frame in a manner to minimize the storage area required, together with a fabric article carrier means having a opening at its upper end which is reinforced to normally urge the opening to an open position and a rigid member which is hinged to the frame and which is extendable to support the lower portion of the article carrier means and which can be folded against the frame to facilitate storage of the cart.

These and other objects and features of the present invention will be apparent form the following detailed description, taken with reference to the figures of the accompanying drawing.

DETAILED DESCRIPTION OF THE INVENTION

Figure 1:
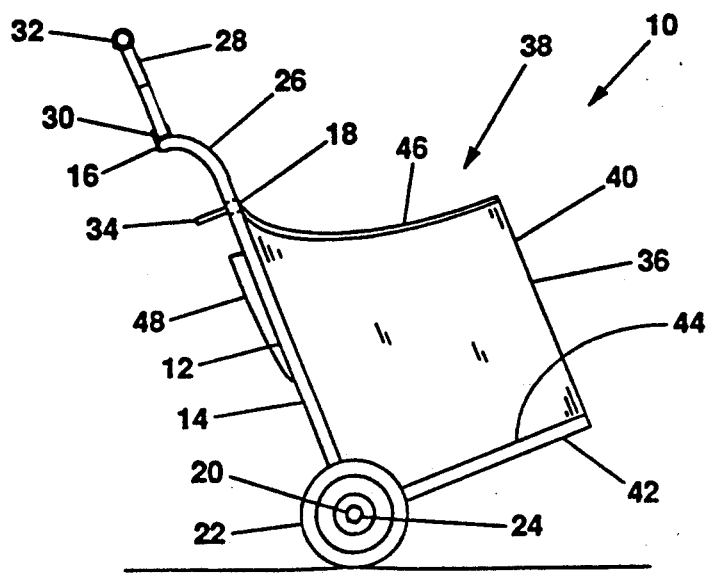
FIG. 1 is a side view of a cart embodying the present invention shown assembled for use.
Figure 2:
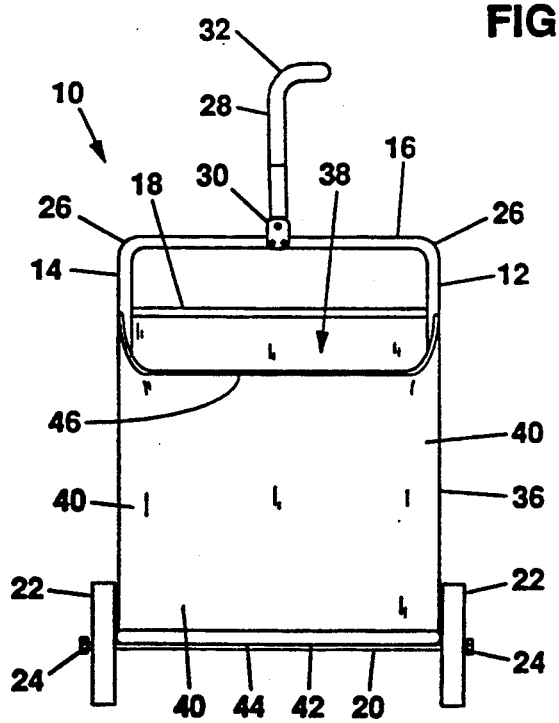
FIG. 2 is a front view of the cart of FIG. 1.
Figure 3:
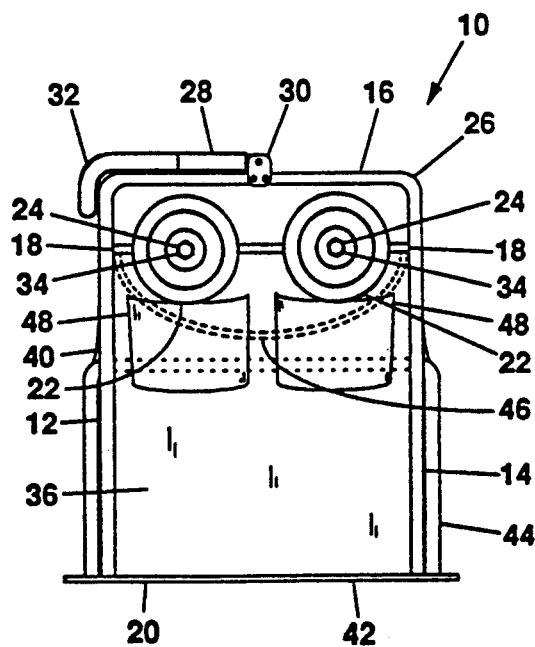
FIG. 3 is a rear view of the cart of FIG. 1 shown collapsed for storage.

In that form of the present invention chosen for purposes of illustration in the drawing, FIGS. 1 and 2 show a cart, indicated generally at 10, having a generally rigid, rectangular frame 12 formed by a pair of vertical members 14, a pair of horizontal members 16 and 18 and an axle 20 which extends transversely across the lower end of the frame 12 and projects beyond both of the vertical members 14 and 16 to receive a pair of wheels 22 which are releaseably retained on the respective ends of the axle 20 by suitable means, such as nuts 24. The upper ends 26 of the vertical members 14 of the frame 12 are, preferably, curved rearwardly, as best seen in FIG. 1, to serve as a handle portion. Moreover, if desired, an additional handle member 28 may be mounted on the center of the upper horizontal member 16. Preferably, the handle member 28 is secured to the horizontal member 16 by a suitable hinge member 30 which allows the handle member 28 to be extended for use, as seen in FIGS. 1 and 2, or to be folded to lie substantially parallel to the horizontal member 16 for storage, as seen in FIG. 3. The handle member 28 preferably has a curved portion 32 which corresponds to the corners of the frame 12 and the hinge member 30 may also include means to permit the handle member 28 to pivot so that its curved portion 32 can be swung to a position in which is curves forwardly for use, as seen in FIG. 1, but can be made to lie substantially parallel to the frame 12 for storage, as seen in FIG. 3. Also, horizontal member 18 is provided with a pair of studs 34 which project perpendicularly outward from the horizontal member 18 to permit the wheels 22 to be mounted on the studs 34 for storage. Nuts 24 may be employed to releaeably secure the wheels 22 to the studs 34, as seen in FIG. 3.

A generally box-shaped article carrier means 36 is mounted to the frame 12 and is preferably formed of flexible material, such as fabric. The upper end 38 of the article carrier means 36 is open, as best seen in FIG. 2, while the sides 40 and bottom 42 of the article carrier means 36 are closed. A generally U-shaped rigid member 44 extends about the edge of the bottom 42 of the article carrier means 36 and the ends of the rigid member 44 are hinged to the frame 12, as seen at 46 in FIGS. 2 and 3. The rigid member 44 may be extended, as seen in FIG. 1, to extend the bottom 42 of the article carrier means 36 for use, and may be folded against the vertical members 14 of the frame 12 to minimize the space required for storage of the cart 10. Preferably, a semi-rigid member 46, such as a cord or stranded steel cable, is provided extending about the mouth of the open upper end 38 of the article carrier means 36 to urge the upper end 38 to an extended position, as seen in FIGS. 1 and 2, to facilitate inserting articles into and removing articles from within the article carrier means 36.

If desired, one or more pockets may be provided on the outside of the rear of the article carrier means 36 adjacent the horizontal member 18, as seen at 48 in FIGS. 1 and 3, to provide additional storage. Alternatively, the studs 34 may be omitted and the wheels 22 may be stored in the pockets 48, when the cart 10 is not in use.

When not in use, the cart 10 may be stored in its folded position, as seen in FIG. 3, and will require a minimum amount of storage space. To assemble the cart 10 for use, the wheels 22 are removed from the studs 34 and are secured to the ends of the axle 20 by means of nuts 24. Thereafter, the rigid member 44 is moved to its extended position, as seen in FIG. 1, which extends the bottom 42 of the article carrier means 36 and causes the semi-rigid cord 46 to urge the open upper end 38 of the article carrier means 36 to its extended position. Finally, if desired, handle member 28 may be swung to its extended position, as seen in FIG. 1, and the cart 10 is ready for use. Because the rigid member 44 and semi-rigid cord 46 normally urge the article carrier means 36 to its extended position, as seen in FIG. 1, insertion of articles into and removal of articles from within the article carrier means 36 is greatly facilitated. For storage, the user simply swings the handle member 28 to lie substantially parallel to horizontal member 16, as seen in FIG. 3, removes the wheels 22 from the axle 20 and releaseably secures the wheels 22 onto the studs 34 by means of nuts 24 and, finally, folds the rigid member 44 to lie against the vertical members 14 of the frame 12. The cart 10 is, thus, restored to its stowing position, as seen in FIG. 3.

Obviously, numerous variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A cart comprising:
   a rigid frame having an axle extending transversely across a lower end of said rigid frame,
   a pair of wheels releasably mounted on the ends of said axle,
   article carrier means formed of flexible material mounted on said rigid frame,
   a rigid member supporting the lower portion of the article carrier means hingedly secured to the lower end of said frame,
   a flexible member supporting the upper portion of said article carrier means in an extended position when said rigid member is extended substantially perpendicular to said rigid frame,
   a pair of vertical members forming the sides of said rigid frame,
   a first horizontal member joining the upper ends of said pair of vertical members,
   a second horizontal member forming a part of said frame extending between said pair of vertical members below said first horizontal member, and having a pair of studs projecting perpendicularly outward from said second horizontal member comprising means for releasable mounting said pair of wheels for storage.

2. The cart of claim 1 further comprising:
   said article carrier means having an open upper end, and
   said flexible member extending about the edge of said upper end to urge said upper end to an extended position.

3. The cart of claim 1 wherein:
   the upper ends of said vertical members are curved forward.

4. The cart of claim 3 further comprising:
   a handle member hingedly mounted on said first horizontal member and movable between an extended position for use as a handle and a stowed position lying substantially parallel to said first horizontal member.

5. The cart of claim 4 wherein:
   the upper end of said handle member is curved and said handle member is pivotally connected to said first horizontal member to permit movement of said curved end to extend perpendicular to said first horizontal member.

6. The cart of claim 1 wherein:
   said article carrier means is formed of fabric.

7. The cart of claim 1 further comprising:
   at least one pocket formed on the outside of said article carrier means.

8. The cart of claim 7 wherein:
   said pocket is large enough to receive at least one of wheels when said cart is not in use.

* * * * *